United States Patent
Zampetti

(10) Patent No.: US 8,644,348 B2
(45) Date of Patent: Feb. 4, 2014

(54) METHOD FOR GENERATING A ROBUST TIMING CORRECTION IN TIMING TRANSFER SYSTEMS

(75) Inventor: George P. Zampetti, Livermore, CA (US)

(73) Assignee: Symmetricom, Inc., San Jose, CA (US)

(*) Notice: Subject to any disclaimer, the term of this patent is extended or adjusted under 35 U.S.C. 154(b) by 121 days.

(21) Appl. No.: 13/091,097

(22) Filed: Apr. 20, 2011

(65) Prior Publication Data
US 2012/0269204 A1 Oct. 25, 2012

(51) Int. Cl.
*H04J 3/06* (2006.01)

(52) U.S. Cl.
USPC .......................................... 370/503; 455/502

(58) Field of Classification Search
USPC .......................................... 370/503; 455/502
See application file for complete search history.

(56) References Cited

U.S. PATENT DOCUMENTS

| | | | |
|---|---|---|---|
| 5,751,777 A | 5/1998 | Zampetti | |
| 5,943,381 A | 8/1999 | Zampetti | |
| 7,664,118 B2 | 2/2010 | Sasson et al. | |
| 8,130,785 B2 * | 3/2012 | Weigl et al. | 370/451 |
| 8,325,704 B1 * | 12/2012 | Lemkin et al. | 370/350 |
| 2004/0076190 A1 | 4/2004 | Goel et al. | |
| 2005/0100006 A1 | 5/2005 | Scott et al. | |
| 2005/0100076 A1 * | 5/2005 | Gazdzinski et al. | 375/130 |
| 2006/0146865 A1 | 7/2006 | Crowle et al. | |
| 2007/0019686 A1 * | 1/2007 | Belk et al. | 370/516 |
| 2008/0175275 A1 * | 7/2008 | Garner et al. | 370/503 |
| 2010/0085989 A1 * | 4/2010 | Belhadj et al. | 370/503 |
| 2011/0064091 A1 | 3/2011 | Darras et al. | |
| 2011/0122775 A1 | 5/2011 | Zampetti et al. | |
| 2011/0134766 A1 | 6/2011 | Zampetti et al. | |
| 2011/0142079 A1 * | 6/2011 | Wong et al. | 370/503 |
| 2011/0176483 A1 * | 7/2011 | Palanki et al. | 370/328 |

* cited by examiner

*Primary Examiner* — Chi Pham
*Assistant Examiner* — Raul Rivas
(74) *Attorney, Agent, or Firm* — Patterson & Sheridan LLP

(57) ABSTRACT

High accuracy timing over packet networks is achieved by generating correction factors from multiple separation intervals and timing information contained in packets in both directions between a master and a slave. The methods are based on evaluating the weighted average of short-term, medium-term, and long-term measurements of local clock offset. Weighted averages are used to develop robust correction terms that are modified with an α-shaping factor to provide additional immunity to packet network instabilities.

23 Claims, 9 Drawing Sheets

METHOD FOR GENERATING A ROBUST TIMING CORRECTION IN TIMING TRANSFER SYSTEMS

BACKGROUND

One of the more important requirements of a digital communication network is to support real-time communications applications which, typically, require time or frequency alignment, or a combination of both. For example, time alignment (also referred to as "phase alignment") is used by real-time instrumentation systems gathering data at specific time intervals or operating machinery according to specific timing. Frequency alignment is required in time-division-multiplexed (TDM) systems and in multi-media streaming systems, which require fixed, reproducible, video or audio sample rates across multiple clients.

In conventional TDM networks, physical layer methods implement frequency alignment throughout the network. The master clock 101 clock system delivers (frequency) timing information via bit-timing (or symbol-timing) information associated with downstream physical communication links to slave clock systems 102 enabling the latter to frequency-align with the former.

While frequency alignment within conventional TDM networks is relatively straightforward, packet-switched networks, such as networks based on Internet Protocols ("IP"), present time and frequency alignment challenges because packet networks are not conventionally designed to provide precise delivery time for data or precise timing at any lower protocol levels. A key difference is that the switching and multiplexing functions are not deterministic, as they are in TDM networks. In particular, packet networks typically involve multiple nodes that may store and forward data packets, potentially introducing significant, randomly distributed, transit delay variation between any two points. Furthermore, packet networks introduce transit delay and transit delay variation that is load dependent and since the traffic loading is generally not constant, the transit delay variation cannot be modeled as a stationary random process.

To address time and frequency alignment challenges inherent in packet networks, certain protocols based on the industry standard internet protocol (IP) have been developed and deployed. One IP-based time alignment protocol is known in the art as Network Time Protocol (NTP). NTP is used for aligning time between a client and one or more master time references. Precision Time Protocol (PTP) is a second IP-based time alignment protocol for aligning one or more client devices to a master time reference. PTP has also been proposed as a protocol supporting frequency alignment. However, NTP and PTP are simply protocols and do not solve the problem of variable transit delay. A slave clock system utilizing NTP, PTP, or any other time alignment protocol, transmitted over a packet network must still account for transit delay variation within the network. In fact, overall time alignment accuracy is generally determined by the ability of a system implementing time alignment to account for transit delay variation between a time reference ("master" or "server") and a clock aligning to the time reference ("slave" or "client").

Lightly loaded packet networks typically present relatively low transit delay variation, allowing IP-based alignment protocols such as NTP and PTP to easily achieve excellent accuracy relative to each protocol's specification. For example, in a lightly loaded gigabit Ethernet-based network, PTP can theoretically provide alignment of better than one hundred nanoseconds. However, conventional networks typically have a wide range of bandwidth loading conditions, which leads to large transit delay variations. This transit delay variation typically leads to severe degradation of time alignment accuracy.

Furthermore, network elements comprising the packet network may process sequential packets differently, depending on prevailing congestion conditions that result from increased bandwidth loading within the network. For example, a network element may forward all packets according to one delay profile until a congestion threshold is exceeded. Once the congestion threshold is exceeded, the network element may delay high priority packets, and drop low priority packets. If congestion on the network element drops below the congestion threshold, then the network element may stop delaying high priority packets and stop dropping low priority packets.

Frequency alignment between a frequency reference (master clock) and a frequency client (slave clock) may be disrupted by abrupt changes in transit delays resulting from one or more intervening network elements switching from normal mode to congestion mode. Because conventional frequency alignment protocols presume transit delay does not change abruptly, a conventional client device commonly interprets a change in transit delay resulting from a network element changing between normal mode and congestion mode to be the result of a local frequency error. The conventional client device may adjust for the local frequency error, even though no adjustment is actually needed. Similarly, time alignment between a time reference (master) and a time client (slave) may also be disrupted by abrupt changes in transit delays resulting from one or more network elements switching from normal mode to congestion mode.

Thus, several factors, including network congestion and network element policies for packet processing, may contribute to greater transit delay variation in a packet network. Unfortunately, transit delay variation typically reduces accuracy and reliability of time and frequency alignment systems that conventionally depend on stability of transit delay within the packet network. Techniques described in the prior art are generally based on some variation of adaptive clock recovery and use filtering methods or straight-line-fitting methods to extract a frequency reference. However, these are not robust enough to handle the variability of packet delay variation effects and thereby are not suitable for meeting the stringent performance criteria that are targeted by this invention.

SUMMARY

One or more embodiments of the present invention provide techniques for developing robust frequency and phase correction factors based on measurement of transit delay of packets in a timing flow between master and slave. The methods are based on evaluating the weighted average of short-term, medium-term, and long-term measurements of local clock offset.

A method of correcting a clock, according to an embodiment of the present invention, includes the steps of receiving packets during at least first and second time windows, computing transit delays associated with the packets based on time stamps contained in the packets received during the first and second time windows, determining a representative transit delay for each of the first and second time windows, estimating a frequency offset of the clock based on the representative transit delays of at least two time windows, and correcting the clock using the estimated frequency offset.

A method of correcting a clock, according to another embodiment of the present invention, includes the steps of receiving and transmitting packets during a time window, computing transit delays associated with the packets based on time stamps contained in the received and transmitted packets, determining a first representative transit delay of the received packets and a second representative transit delay of the transmitted packets, estimating an offset of the clock based on the first and second representative transit delays, and correcting the clock using the estimated offset.

A method of correcting a clock, according to still another embodiment of the present invention, includes the steps of storing representative transit delays associated with a plurality of previous time windows in a buffer, computing transit delays associated with packets based on time stamps contained in the packets received and transmitted during a current time window, determining a representative transit delay for each of the received packets and the transmitted packets, storing the representative transit delays for the received packets and the transmitted packets in the buffer, estimating an offset of the clock based on the representative transit delays stored in the buffer, and correcting the clock using the estimated offset.

A clock offset estimating device, according to an embodiment of the present invention, includes a buffer that stores representative transit delays associated with a plurality of time windows, and a processing unit programmed to estimate an offset of the clock based on at least two representative transit delays stored in the buffer. A frequency offset for the clock is estimated based on representative transit delays associated with at least two time windows, and a time offset for the clock is estimated based on representative transit delays associated with at least one time window.

Further embodiments of the present invention include, without limitation, a non-transitory computer-readable storage medium that includes instructions that enable a processing unit to implement one or more aspects of the above methods as well as a computer system configured to implement one or more aspects of the above methods.

DETAILED DESCRIPTION

Figure 1:
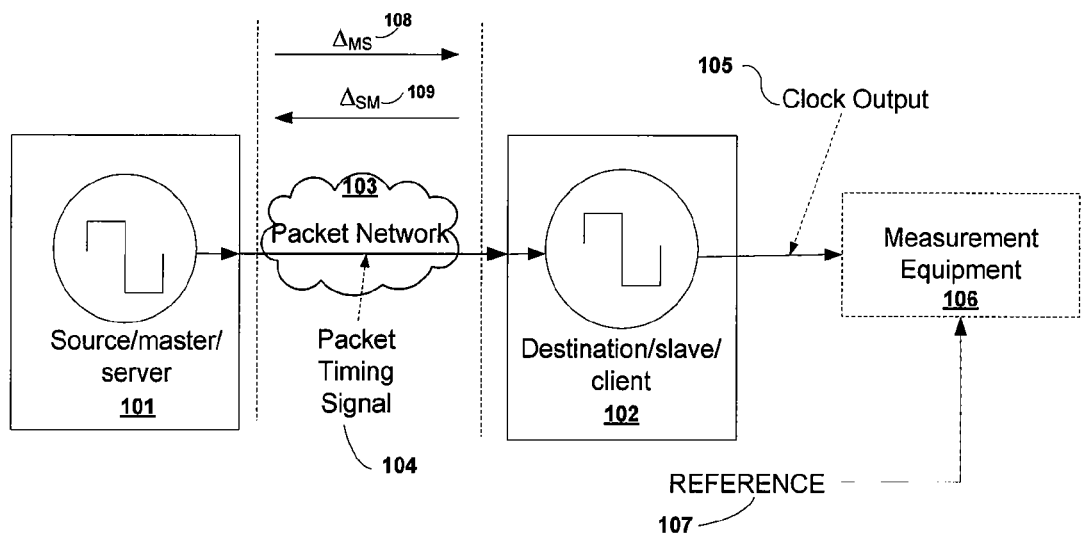
FIG. 1 is a conceptual diagram of a master-slave clock system in which one or more embodiments of the present invention may be implemented.

FIG. 1 is a conceptual diagram of a master-slave clock system in which one or more embodiments of the present invention may be implemented. The system of FIG. 1 includes a master clock 101 (also referred to as a server clock or a source clock) that delivers packet timing signal 104 over a packet network 103 to a slave clock 102 (also referred to as a destination clock or a client clock). The packet timing signal 104 comprises time-stamped packets that are transmitted at a nominally regular time interval between packets. The slave clock 102 generates a clock output 105 that can be measured by measuring equipment 106 against a timing reference 107 to verify compliance to clock performance requirements.

Figure 2:
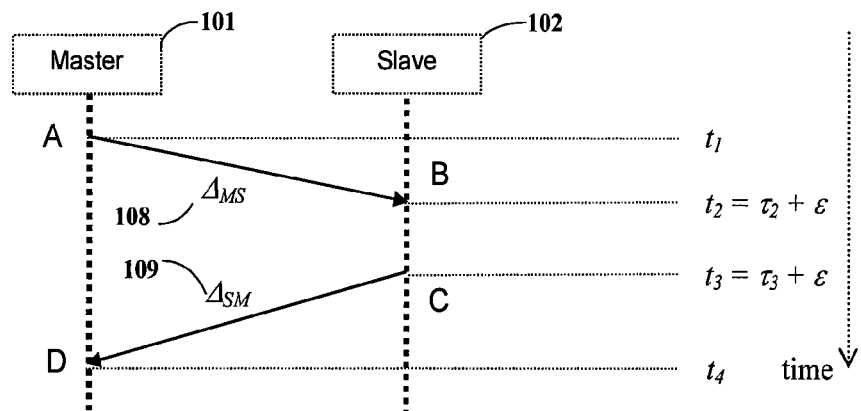
FIG. 2 is a conceptual diagram that indicates the manner in which timing information is construed based on transmission of packets between master and slave clocks of FIG. 1.

FIG. 2 is a conceptual diagram that indicates the manner in which timing information, i.e., the packet timing signal 104, is construed based on transmission of packets between master and slave clocks of FIG. 1. The packet that traverses the packet network 103 from the master clock 101 to the slave clock 102 leaves the master clock 101 at time $t_1$ (labeled as "A"). This constitutes the time-of-departure time-stamp. After a transit delay of $\Delta_{MS}$ 108, the packet arrives at the slave clock 102 at time $t_2$. The slave clock 102 measures this time-of-arrival as $\tau_2$ based on the slave clock 102. That is, the time-stamp for time-of-arrival has the value $\tau_2$. Denoting by $\epsilon$ the time-offset (the difference in time between the master and slave) of the slave clock 102, $$t_2 = \tau_2 + \epsilon \qquad (Eq. 1)$$

For packets originating at the slave clock 102 and transmitted to the master clock 101, the time-of-departure time-stamp contains $\tau_3$, the slave clock's estimate of time-of-departure. The actual (true) time-of-departure $\tau_3$ is related to $\tau_3$, by $$t_3 = \Sigma_3 + \epsilon \qquad (Eq. 2)$$

After a transit delay of $\Delta_{SM}$ 109, the packet arrives at the master clock 101 at time $t_4$.

Such a two-way exchange of packets can provide information suitable for allowing the slave clock 102 to align in time with the master clock 101 (assuming that both sides have knowledge of the time stamps). If the exchange of information is only one-way the slave clock 102 can still align its clock (frequency) with the master clock 101, a process known as syntonization. There are four measured values (time-stamps) that can be communicated between the master clock 101 and the slave clock 102, namely, $(t_1, \tau_2, \tau_3, t_4)$. In the two-way exchange of packets, the master-to-slave packet and the slave-to-master packet do not have to be consecutive as long as the time-stamp information is communicated appropriately. In some instances the rate at which packets are transmitted in the two directions can be different. The following equations can be established:

$$t_4 = \tau_3 + \epsilon + \Delta_{SM} \text{ (slave-to-master packet)}$$

$$t_1 = \tau_2 + \epsilon - \Delta_{MS} \text{ (master-to-slave packet)} \qquad (Eq. 3)$$

In an actual time-transfer situation, there are two equations with three unknowns so it is common practice to assume reciprocity of transit delay between the two devices, therefore reducing the number of unknowns to two and then computing $\epsilon$, the slave clock 102 time offset with respect to the master, as the solution to a pair of linear simultaneous equations (embodied in Eq. (3)).

The estimates of transit delay based purely on the available time-stamps can be established as:

$$\delta_{SM}(t_4) = t_4 - \tau_3$$

$$\delta_{SM}(t_1) = \tau_2 - t_1 \quad \text{(Eq. 4)}$$

These estimates are, however, erroneous in the sense that they do not include the slave clock 102 time offset. The estimates are also expressed as functions of time which indicates that they may not be constant. Furthermore, the notion of the independent variable representing time is assumed to be coincident with the master clock 101.

Because of the fundamental statistical behavior of packet networks, the transit delays are not fixed and can vary from packet to packet. To counter this packet delay variation (PDV), as well as to account for any drift in the slave clock 102 oscillator, the estimates of clock offset are made routinely and it is well known that the mitigation of the deleterious effects of packet delay variation and oscillator drift is improved by using more frequent exchanges of timing packets.

Well-known IP protocols such as PTP and NTP provide the framework to permit interoperability of equipment and define the structure of the packets, format of the time-stamps and the rules for the packet flows that comprise the packet timing signal. The packet delay variation introduced by the packet network adds noise to the timing signal that has to be attenuated/eliminated by the clock recovery function in the slave clock 102. Specifically, for a given application, the slave clock output 105 must meet certain requirements. These requirements are generally specified in terms of MTIE (maximum time interval error) or TDEV (time deviation) masks. These masks represent upper bounds on the MTIE or TDEV extracted from measurements of the clock output 105 relative to a known good reference 107 using suitable measurement equipment 106.

In the general telecommunications environment there are several layers of masks ranging from "loose" to "tight." Examples of the "loose" masks are those associated with clocks operating at traffic interfaces; "tight" masks apply to clocks operating at interfaces suitable for delivering synchronization and are called "sync masks." The prior art in the field of synchronization over packet networks has suggested the feasibility of meeting the less stringent "traffic masks"; one or more embodiments of the present invention described here provide a technique that is capable of recovering clock information suitable for meeting the more stringent "sync masks."

Figure 3:
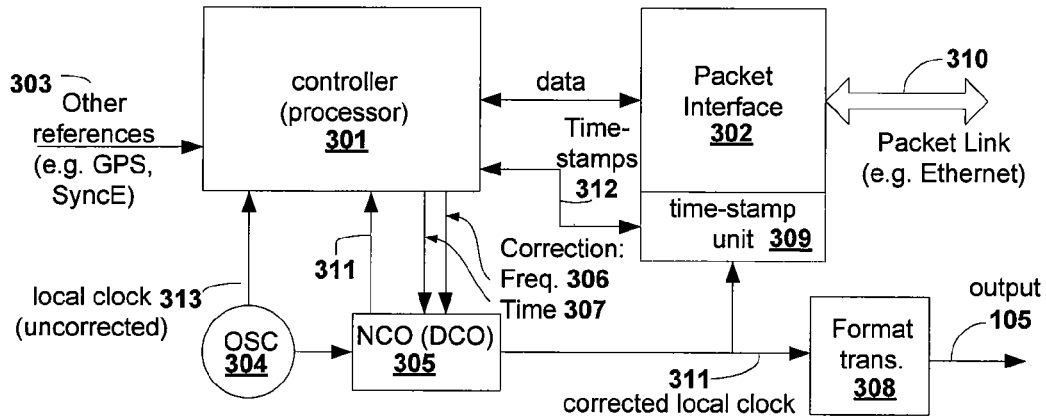
FIG. 3 illustrates the configuration of a slave clock of FIG. 1, identifying the principal components relevant to synchronization.

FIG. 3 illustrates the configuration of a slave clock of FIG. 1, identifying the principal components relevant to synchronization. The packet interface 302 communicates over the packet network 103 using a suitable transmission method 310. A time-stamping unit 309 captures the time-of-arrival into the slave clock 102 of packets from the master clock 101 and the time-of-departure from the slave clock 102 of packets sent to the master clock 101. The time-stamps 312 are communicated between the time-stamp unit 309 and the main processing unit 301. The main processing unit 301 monitors the uncorrected clock 313 as well as the corrected local clock 311. The corrected local clock 311 is used to provide a timing signal to the time-stamp unit 309. The format translator 308 converts the corrected clock to the appropriate format for the clock output 105 using well-known methods. The corrected clock 311 is generated from the uncorrected clock 313 using an NCO (numerically controlled oscillator, also known as a "digitally controlled oscillator" or DCO) subsystem 305 utilizing frequency correction 306 and time correction (aka phase correction) 307 provided by the main processing unit 301. If other references 303 are available, they can be introduced into the correction term as taught in U.S. Pat. No. 5,943,381, "Multiple Input Frequency Locked Loop", and U.S. Pat. No. 5,751,777, "Multiple Input Frequency Locked Loop" the contents of which are included herein by reference.

In an alternative embodiment of FIG. 3, the oscillator 304 and the numerically controlled oscillator (NCO) 305 can be implemented as a combination of digital-to-analog converter and voltage controlled oscillator (VCO).

If the period associated with the nominal packet rate is denoted by $\tau_P$, then packet transmissions can be considered to be made on a nominally uniform time grid, namely every $\tau_P$ units of time (e.g., seconds). Then, in an observation interval of duration, $\tau_0$ seconds, there will be N samples of the transit delay where $\tau_0 = N \cdot \tau_P$. One or more embodiments of the present invention utilize a pre-processing (i.e., packet selection) step as taught in U.S. patent application Ser. No. 12/632,643, filed Dec. 7, 2009, and entitled "Method and Apparatus for Finding Latency Floor in Packet Networks," the entire contents of which are incorporated by reference herein. This pre-processing step establishes a representative transit delay for the window, effectively establishing a new (hypothetical) packet stream with packet interval $\tau_0$ and transit delays equal to this representative transit delay.

In PTP implementations, the packet rate varies between 2 packets per second and 128 packets per second with a typical value of 10 packets per second. In the following description, $\tau_0$ is selected as 128 seconds. It should be recognized that higher quality oscillators permit larger values of $\tau_0$ and this particular choice (128 s) is appropriate for a wide range of oscillator types.

Figure 4:
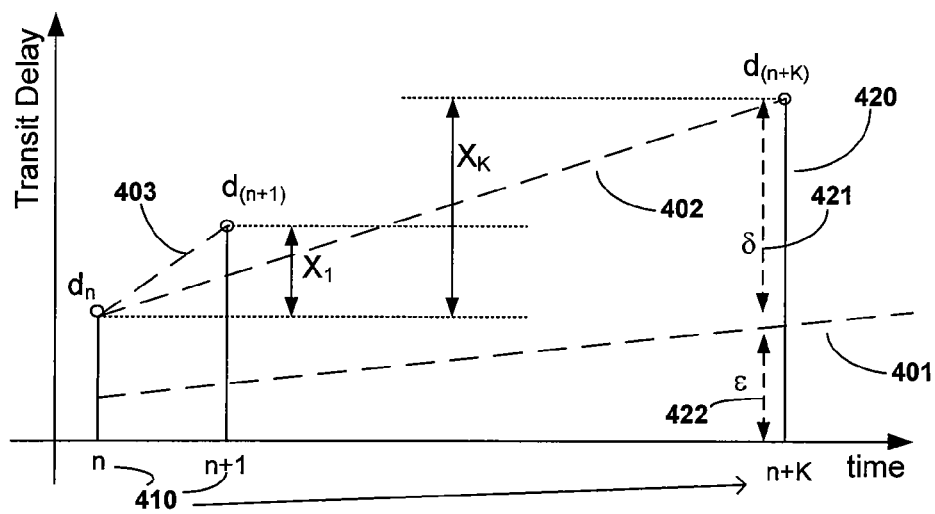
FIG. 4 is a graphical representation of transit delay components.

FIG. 4 is a graphical representation of transit delay components. For clarity, only three transit delay values corresponding to records with index n, (n+1), and (n+K) are shown. The transit delay values corresponding to these packets are $d_n$, $d_{(n+1)}$, and $d_{(n+K)}$, respectively. The transit delay value corresponds to the sum of the actual delay $\delta$ and local clock offset $\epsilon$ (these are shown only for packet indexed by (n+K)). The slopes of the dashed lines are related to frequency offsets.

The principle of clock recovery is illustrated FIG. 4. For illustrative purposes, the frequency offset of the local oscillator is depicted as the dotted line 401. The slope of the line is representative of the frequency offset of the local oscillator. The transit delay estimates indexed by n, (n+1), and (n+K) are shown as $d_n$, $d_{(n+1)}$, and $d_{(n+K)}$, respectively. The effective separation in time of these estimates is $\tau_0$ between index n and (n+1) and $K \cdot \tau_0$ between indices (n) and (n+K). The estimate of the frequency offset based on indices (n) and (n+1) is created by taking the difference in (estimated) transit delay for the two indices, namely, $$X_1 = d_{(n+1)} - d_n \quad \text{(Eq. 5)}$$

and establishing the slope (see line 403 in FIG. 4)

$$\eta_1 = \frac{X_1}{1 \cdot \tau_0} \quad \text{(Eq. 6)}$$

The estimate of the frequency offset based indices (n) and (n+K) is created by taking the difference in (estimated) transit delay for the two indices, namely, $$X_K = d_{(n+K)} - d_n \quad \text{(Eq. 7)}$$

and establishing the slope (see line 402 in FIG. 4)

$$\eta_K = \frac{X_K}{K \cdot \tau_0} \quad \text{(Eq. 8)}$$

If the transit delay across the packet network is a constant, equal for every packet, then both estimates of slope will be the same and equal to the frequency offset (slope of line 401) provided the frequency offset is constant over the interval of time the measurements are made. If the frequency offset is constant and the statistics of the packet delay variation are constant over the period of measurement, then the accuracy of the frequency offset estimate is better for larger K; i.e., $\eta_K$ is more accurate than $\eta^1$. Prior art methods assume that the statistics of the PDV are constant (i.e., stationary) and establish an "optimal" frequency offset estimate by applying a single least-squares straight-line fit to the transit delay estimate sequence. However, this is not optimal if the statistics are not constant. One or more embodiments of the present invention consider short/medium/long term estimates to account for the fact that the PDV is not stationary.

The transit delay measurements are pre-processed to reduce the effective PDV noise. Specifically, in each pre-processing window, the floor of the PDV is determined and used as the representative transit delay estimate for the pre-processing window. U.S. patent application Ser. No. 12/632,643 referenced above describes such a method. In one embodiment, appropriate for low and medium loading with few network elements between the master and slave clocks, the minimum observed transit delay among the packets in the window is used as the representative transit delay since this is a good estimate of the floor. In another embodiment, that improves the accuracy of the estimate of the floor in cases of medium to high loading with a significant number of network elements between the master clock and slave clock, the location of the floor is estimated from the distribution of the transit delays of the window as taught in said U.S. patent application Ser. No. 12/632,643.

Figure 5:
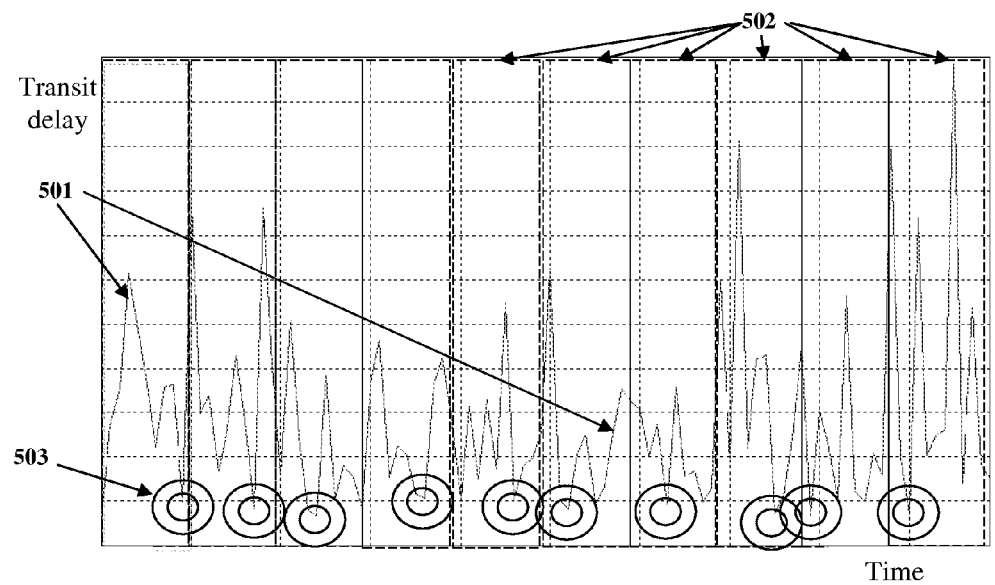
FIG. 5 is a graphical representation of transit delay measurements over time.

FIG. 5 is a graphical representation of transit delay measurements 501 made over time. The packets are considered in groups 502 and a representative delay for each group is established. This is depicted in each of the groups 502 via "bulls-eye" 503. For illustrative purposes the packet with minimum transit delay in the window is identified. Both directions of packet transmission (master-to-slave or "forward"; and slave-to-master or "reverse") are considered though for clarity only one direction is indicated in FIG. 5.

Packet pre-processing is depicted FIG. 5. The pre-processing is achieved over contiguous (non-overlapping) windows of observation 502 of duration $\tau_0$ and will have, nominally, N packets. For simplicity, the pre-processing scheme depicted in FIG. 5 is picking the packet with minimum (apparent) delay identified by the concentric circles 503. The result of the pre-processing is a reduction in sample rate. This new transit delay value for each pre-processing window is considered to be representative of the window and the new sampling interval is $\tau_0$ and the new sampling rate is $f_0 = 1/\tau_0 = 1/(N \cdot \tau_P)$. In addition to the estimate of the floor, other parameters that indicate the quality of the timing signal over the window are computed. These include the mean value ($\mu$) of the transit delay (average transit delay computed over the packets in the window) and variance ($\sigma^2$) of the transit delay (computed over the packets in the window). Other sensors in the slave clock device can provide additional information such as temperature and whether there has been a rapid change in temperature, and whether there has been any significant power-supply variation in the interval of the window. The collection of information from these sensors is amalgamated in the form of an environment flag. Both directions of transmission are considered and therefore there will be two estimates of transit delay, mean, variance, and environment flag. If only one-way transmission is used then the environment flag for the unused direction can be set to "do not use" (implying the associated data has zero weighting) and the estimates of other parameters for the unused direction are moot. These and other calculations are performed in the controller 301.

Figure 6:
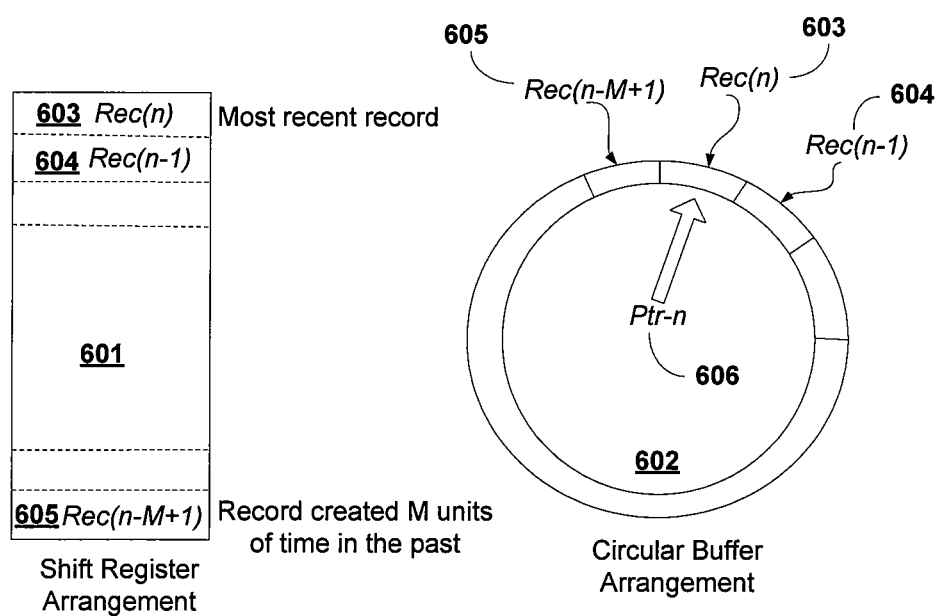
FIG. 6 is a conceptual diagram of a memory structure that stores data relevant to the estimation of frequency offset.

FIG. 6 is a conceptual diagram of a memory structure that stores data relevant to the estimation of frequency offset. The representative delay and other related information for each group is collected as a record denoted by Rec(n) 603 that represents information for the $n^{th}$ $\tau_0$ window. As mentioned above, the related information can include the mean value ($\mu$), the standard deviation ($\sigma$) (variance=$\sigma^2$), and an environment flag. The record can comprise data from both directions of packet transmission. The most recent M records are maintained in a buffer. The common buffering arrangement is a linear shift register 601 or preferably a circular buffer 602 since the latter requires fewer memory access operations.

The frequency estimator utilizes information of time-error that is maintained over the recent past. This information is stored in a data structure such as the ones depicted in FIG. 6. Specifically, if the record of information appropriate for the most recent estimate of time-error is denoted as Rec(n) 603, the database of time-error records comprises a buffer that maintains a history of the past M records. The buffer 601/602 is maintained in the computing element (controller block 301).

In the embodiments of the present invention employing a shift register buffer 601, when a new record is made available (every $\tau_0$), the record corresponding to time index M units in the past is flushed out. The records are then pushed down and the most recent record then occupies the space denoted by Rec(n). Thus the buffer 601 contains the most recent M records representing an interval of time of $M \cdot \tau_0$.

By comparison, the embodiments of the present invention employing a circular buffer 602 require less memory access operations. The circular buffer 602 includes sufficient memory to hold M records. There is a pointer "Ptr-n" 606 that contains the location of the most recent record. When a new record arrives, it is written into the "next" location. With reference to FIG. 6, the "next" location will be where the (old) record corresponding to information M units of time in the past are stored. This new data overwrites the data from M time-units back and what used to be "Rec(n)" becomes "Rec(n−1)." Pictorially, the pointer "Ptr-n" 606 in FIG. 6 moves counterclockwise and always points to the most recent record. The circular nature of the buffer is easily accomplished by maintaining address calculation limited to the addresses of the M storage areas containing the records. The buffer 602 contains the most recent M records representing an interval of time of $M \cdot \tau_0$.

Figure 7:
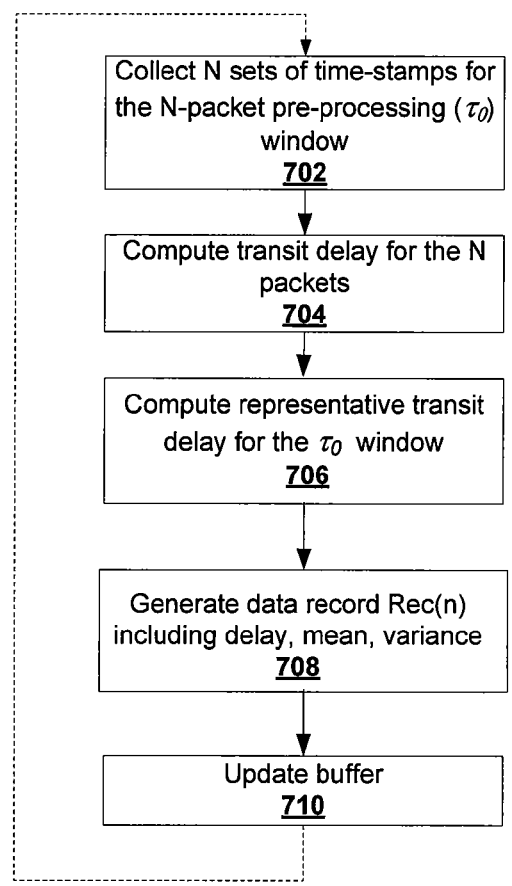
FIG. 7 is a flow diagram of method steps for generating and storing transit delay estimates according to one or more embodiments of the present invention.

FIG. 7 is a flow diagram of method steps for generating transit delay estimates according to one or more embodiments of the present invention. These steps are carried out in the main processing unit 301. In each $\tau_0$ window there will be nominally $N = N_F$ packets in the forward direction and $N = N_R$ packets in the reverse direction. For notational simplicity the term "N" is used here for both. For each packet in the forward direction (master-to-slave) the time-stamps of time-of-departure ($t_1$) and time-of-arrival ($\tau_2$) are collected (step 702) and the transit-delay estimate for the packet computed (step 704). Likewise the transit delay estimate for each packet in the reverse direction is computed using the appropriate timestamps ($\tau_3$ and $t_4$) (steps 702 and 704). The formulas for transit delay in the forward and reverse directions are provided in Eq. (4). For all the packets (nominally $N_F$ for the forward direction or $N_R$ for the reverse direction) of the window of duration $\tau_0$ a representative delay is computed that is the floor for the window (step 706). Representative transit delay values are denoted by $\phi_F(n)$ for the "forward" direction and $\phi_R(n)$ for the "reverse" direction. The index "n" indicates that these representative delay values are associated with the $n^{th}\tau_0$ window as n increases (as time progresses). In addition, the mean and variance of the (nominally) N transit delay values are computed for both the forward and reverse directions. In this manner the record for the $n^{th}$ window, denoted by Rec(n) 603, is created (step 708) and stored in the buffer 601/602 (step 710). These steps are performed continually and implemented for every $\tau_0$ window.

The robust frequency estimator is front-ended with the packet selection and floor extraction block to estimate the appropriate time-error value for the time interval corresponding to the record (steps 702 through 710 described above). Each record is representative of $\tau_0$ (seconds) where $\tau_0$ is typically 128 seconds. The transit delay extraction is done in both the forward and reverse directions. $\phi_F(n)$ and $\phi_R(n)$ are the discrete-time signals (sequences) corresponding to the transit delay signals with samples taken $\tau_0$ (seconds) apart.

In addition to the transit delay samples described above, additional information is available for each block of K samples in the pre-processing window. These include a measure of the bias ($\mu$=mean value) and the noise strength ($\sigma^2$=variance; $\sigma$=standard deviation).

There is certain additional information that is maintained to provide guidance on the validity of the data. One such indicator is representative of whether there was a transient detected in the duration ($\tau_0$) over which the time-error is estimated. Another such indicator is whether or not the data is "old" and has been read out of non-volatile memory. This latter case is appropriate at start-up. This information is summarized in the environment flag that provides an indication to subsequent steps in the generation of frequency correction that the information of the record is less useful.

Figure 8:
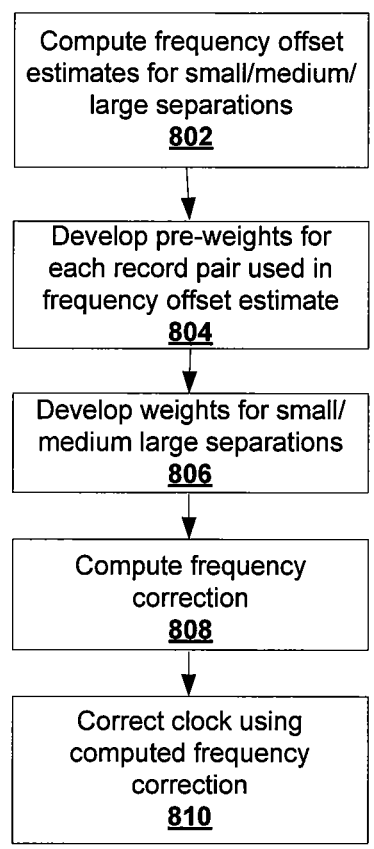
FIG. 8 is a flow diagram of method steps for generating a frequency correction according to an embodiment of the present invention.

FIG. 8 is a flow diagram of method steps for generating a frequency correction factor according to an embodiment of the present invention. These steps are carried out by the main processing unit 301 and performed every time the buffer 601/602 is updated.

Every pair of records in the buffer provides a frequency (error) estimate where the notion of frequency error is the (fractional) frequency error between the master clock 101 and the slave clock 102. If the two clocks are perfectly syntonized and there is no packet-delay variation, the transit delay value should be a constant. Specifically, considering the pair Rec(n−j) and Rec(n−j−k), there is an implicit time interval of $k \cdot \tau_0$ between the two phase measurements (transit delay estimates) associated with the two records. Consequently, an estimate of (fractional) frequency offset is established as:

$$\delta f_{raw}^{(F)}(j, k) = \frac{\phi_F(n-j) - \phi_F(n-j-k)}{k \cdot \tau_0} \qquad \text{(Eq. 9)}$$

subject to the constraints:

$0 \le j \le (M-2)$ $1 \le (j-k) \le (M-1)$ $1 \le k \le (M-1)$ \qquad (Eq. 10)

In (Eq. 9) the superscript (F) identifies the forward direction (master to slave), the subscript "raw" indicates that the frequency estimate is not weighted. The equivalent for the reverse direction (slave to master), with superscript (R), is provided in (Eq. 11) (the constraints of Eq. 10 apply):

$$\delta f_{raw}^{(R)}(j, k) = \frac{\phi_R(n-j) - \phi_R(n-j-k)}{k \cdot \tau_0} \qquad \text{(Eq. 11)}$$

There are numerous such pairs of records that can provide a raw frequency estimate. In particular, there are pairs corresponding to (M−1) choices for k (i.e., k=1, 2, . . . , (M−1)).

For purposes of reducing computational complexity, one embodiment of the invention considers three choices for k corresponding to "small", typically 5; "medium", typically 10; and "large", typically 20. For k=5, there are (M−5) pairs [j=0, 1, . . . , (M−6)]; for k=10 there are (M−10) pairs [j=0, 1, . . . , (M−11)]; and for k=20 there are (M−20) pairs [j=0, 1, . . . , (M−21)]. A typical value for M is 30. Thus there are typically L=55 pairs that are considered together for the forward direction and an equal number in the reverse direction. For notational convenience these L=55 raw frequency estimates are indexed from $\lambda$=0 through $\lambda$=(L−1).

The invention advantageously assigns weights to each frequency estimate. The weight associated with the raw frequency estimate is always non-negative and is assigned based on the following rules.

First is that a large bias ($\mu$) in any record implies that the weight associated with any raw frequency estimate using that record should be small. Second is that a large noise strength ($\sigma$) in any record implies that the weight associated with any raw frequency estimate using that record should be small. Third is that raw frequency estimates obtained using larger values of k are generally assigned larger weights. At start-up, and if any anomaly is detected, then larger weights are assigned to smaller values of k. Fourth is that if the record includes a flag indicating any anomaly, such as a transient, the weight associated with any raw frequency estimate using that record is set to zero. Note that weights are developed for both the forward and reverse directions.

The steps associated with generating the frequency correction are outlined in FIG. 8. The computation associated with this generation is achieved in the processing unit 301 using data from the buffer 601/602. As explained above, there are M=30 records in the buffer and for separations of "small"=$5 \cdot \tau_0$ there are 25 pairs, for separations of "medium"=$10 \cdot \tau_0$ there are 20 pairs, and for separations of "large"=$20 \cdot \tau_0$ there are 10 pairs for a total of 55 pairs. For convenience these 55 pairs are indexed using an index $\lambda$ ranging from 0 through 54. In step 802 the frequency offset estimate for each such pair, identified by values of indices j and k, are computed for the forward and reverse directions using equations (9) and (11), respectively (k=5, 10, 20 for the "small", "medium", and "large" separations).

In step 804, a "pre-weight" (i.e., an initial or "raw" weight) is computed for each pair, identified by the indices j and k, using the additional information of mean value ($\mu$) and standard deviation ($\sigma$). This is done for both the forward and reverse directions. In one embodiment of the invention, the formula used for establishing the pre-weight for the pair of records Rec(n−j) and Rec(n−j−k) [see Eq. (9), (10), (11) where the representative transit delays from these records is used] is $$w_\lambda^{(F)} = \frac{k}{|\mu_{(n-j)}^{(F)}| + |\mu_{(n-j-k)}^{(F)}| + |\kappa \cdot \sigma_{(n-j)}^{(F)}| + |\kappa \cdot \sigma_{(n-j-k)}^{(F)}|} \cdot g^{(F)} \quad \text{(Eq. 12)}$$

$$w_\lambda^{(R)} = \frac{k}{|\mu_{(n-j)}^{(R)}| + |\mu_{(n-j-k)}^{(R)}| + |\kappa \cdot \sigma_{(n-j)}^{(R)}| + |\kappa \cdot \sigma_{(n-j-k)}^{(R)}|} \cdot g^{(R)}$$

where $\mu$ and $\sigma$ are the mean and standard deviation (square-root of variance) quantities in the record; the superscripts (F) and (R) apply to the forward and reverse directions, respectively. The scaling factor $\kappa$ permits the standard deviation to be given higher (usually) priority than the mean value. A typical value for $\kappa$ is 5. The gain term g is either 1 or 0 and indicates whether the pair should be utilized in the frequency correction (=1) or ignored (=0). This is developed from the environment flag. In step 806, the weights for each term is established and in step 808 the frequency correction is constructed as the weighted average of the L=55 frequency estimates.

The frequency (error) estimate based on the raw frequency estimates in the forward direction is generated as $$y^F(n\tau_0) = \frac{\sum_{\lambda=0}^{(L-1)} w_\lambda^{(F)} \cdot (\delta f_{raw}^{(F)}(\lambda))}{\sum_{\lambda=0}^{(L-1)} w_\lambda^{(F)}} \quad \text{(Eq. 13)}$$

$$w^{(F)}(n\tau_0) = \sum_{\lambda=0}^{(L-1)} w_\lambda^{(F)}$$

and in (Eq. 13) the computation of a weighting factor representing this estimate is generated. Simply put, the frequency estimate in the forward direction is computed as the weighted sum of the raw frequency estimates and the overall weight is simply the sum of the individual weights. Note that the construction of (Eq. 13) allows freedom in the range of values of the weights. As a consequence, the combined weight, $w^{(F)}(n\tau_0)$, is representative of the quality of the frequency (error) estimate and can be used to compare the quality of this estimate with estimates made by other means, including the estimate based on the reverse direction or estimates based on other references, e.g., using techniques described in U.S. Pat. Nos. 5,751,777 and 5,943,381, the contents of which are incorporated by reference herein.

The same procedure is followed in the reverse direction. Namely, $$y^R(n\tau_0) = \frac{\sum_{\lambda=0}^{(L-1)} w_\lambda^{(R)} \cdot (\delta f_{raw}^{(R)}(\lambda))}{\sum_{\lambda=0}^{(L-1)} w_\lambda^{(R)}} \quad \text{(Eq. 14)}$$

$$w^{(R)}(n\tau_0) = \sum_{\lambda=0}^{(L-1)} w_\lambda^{(R)}$$

If it is known that the frequency estimation should be done in a one-way manner, the appropriate weight for the other direction is assigned a zero value. That is, external information can be used to readjust the relative weighting in the forward and reverse directions.

Note that the estimates are indexed as "$n\tau_0$". This is to emphasize that this computation is done every $\tau_0$ units of time. That is, when a new record arrives, the buffer is updated and these estimates recomputed.

The robust frequency estimator is then the (weighted) average of the frequency estimates for the forward and reverse directions:

$$y_{avg}(n\tau_0) = \frac{w^{(F)}(n\tau_0) \cdot y^{(F)}(n\tau_0) + w^{(F)}(n\tau_0) \cdot y^{(F)}(n\tau_0)}{w^{(F)}(n\tau_0) + w^{(R)}(n\tau_0)} \quad \text{(Eq. 15)}$$

The aggregate weighting of this robust frequency estimator is $$w_{avg}(n\tau_0) = w^{(F)}(n\tau_0) + w^{(R)}(n\tau_0) \quad \text{(Eq.16)}$$

The actual frequency correction 306 applied to the NCO in step 810 is derived from the robust frequency estimate shown in Eq. 15.

In another embodiment of the invention, an additional smoothing factor is applied to the frequency correction. This is done by introducing the notion of the $\alpha$-shaping factor. The $\alpha$-shaping factor permits the adaptation of the contribution of the current robust frequency estimate to the actual frequency correction to accommodate the effects of ambient temperature and other factors that are known to impact the behavior of oscillators. In addition, the $\alpha$-shaping factor can include the adaptation required to account for instabilities in the packet network.

Figure 9:
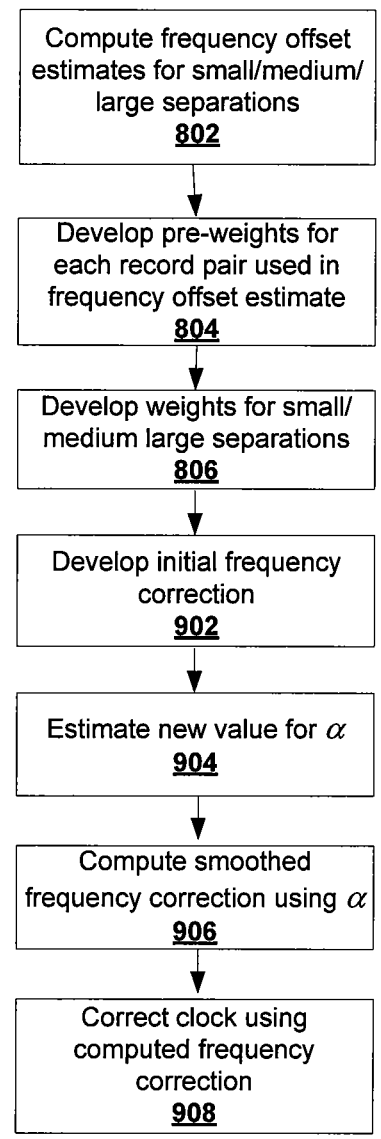
FIG. 9 is a flow diagram of method steps for generating a frequency correction according to another embodiment of the present invention.

FIG. 9 outlines the steps for developing a frequency correction that includes $\alpha$-shaping. The steps 802 through 806 are substantially the same as in FIG. 8 and the frequency correction generated in step 808 is referred to as the "initial" frequency correction in step 902.

One metric that identifies instability in the packet network is based on the aggregate weight, $w_{avg}(n\tau_0)$, of the robust frequency estimate for time-interval (pre-processing window) associated with $n\tau_0$. The current value of the weight is compared with a smoothed (average) value of the weight computed over several time-intervals, typically 5 times the buffer size, in the recent past. If the current value is significantly different from the average of the recent past, then an event exacerbating instability has occurred and the current estimate of frequency correction is less reliable. In one embodiment of the invention, the value of $\alpha$ is chosen as 0.95 if an instability has not been detected and is chosen as 0.05 if an instability has been detected. An instability is considered present if the said current value is more than 50% different from the said average over the recent past.

Having determined the value of $\alpha$ (between 0 and 1), the actual frequency correction term 306 is computed in step 906 as $y_{act}(n\tau_0)$, where $$y_{act}(n\tau_0) = \alpha \cdot y_{avg}(n\tau_0) + (1-\alpha) \cdot y_{act}((n-1) \cdot \tau_0) \quad \text{(Eq. 17)}$$

The larger the value of $\alpha$, the greater is the contribution of the most recent robust frequency estimate.

Figure 10:
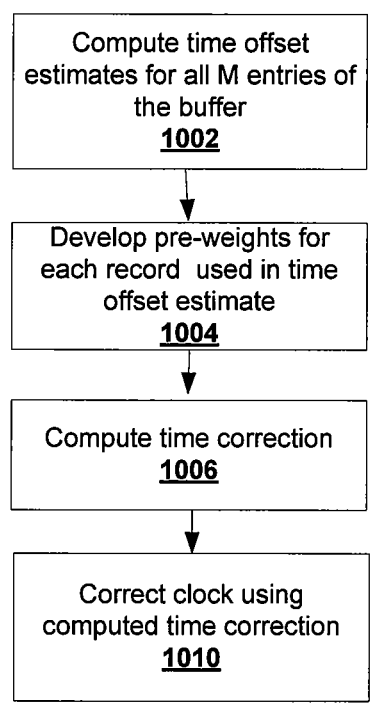
FIG. 10 is a flow diagram of method steps for generating a time/phase correction according to an embodiment of the present invention.

In another embodiment of the invention, the alignment between slave clock 102 and master clock 101 is extended to include phase alignment (also called time alignment). With reference to FIG. 10, the following steps are carried out to develop the time correction 307.

In step 1002 the time (phase) offset between the master and slave is computed for all M records using data from both the forward and reverse directions. Specifically, the estimate of offset is given by:

$$\xi_{raw}(n\tau_0) = \frac{1}{2} \cdot (\phi_R(n\tau_0) - \phi_F(n\tau_0)) \quad \text{(Eq. 18)}$$

where $\phi_R$ and $\phi_F$ are the representative transit delay values for the most recent window, that is identified in time by "$n\tau_0$", corresponding to the reverse and forward directions respectively and are available in Rec(n) 603.

It should be recognized that in practice only the most recent record needs to be processed each time and the result can be stored in the record for use in subsequent $\tau_0$ window interval.

In a manner analogous to the weighting of the frequency estimate, the offset estimate is weighted appropriately. In step 1004, the (pre-)weighting term, $w_T(n\tau_0)$, that represents the combination of the two directions, is computed. In one embodiment, the pre-weight associated with a particular record is computed as:

$$w_T(n\tau_0) = \frac{1}{|\mu_n^{(F)}| + |\mu_n^{(R)}| + |\kappa \cdot \sigma_n^{(F)}| + |\kappa \cdot \sigma_n^{(R)}|} \cdot g_n \quad \text{(Eq. 19)}$$

where the means $\mu$, the standard deviations, $\sigma$, are available in Rec(n) and the superscripts identify the direction. The scale factor $\kappa$, typically 5, assigns a greater importance to the standard deviation than the mean. The gain term $g_n$ is based on the environmental flags and can be used to "deweight" a record by assigning a value of 0 is the data in the record is deemed untrustworthy for any reason.

As depicted in FIG. 10 step 1006, the robust time-offset estimator (clock time correction) is evaluated by considering all the records in the M-location buffer:

$$\xi_{avg}(n\tau_0) = \frac{\sum_{k=0}^{(M-1)} w_T((n-k)\tau_0) \cdot \xi_{raw}((n-k)\tau_0)}{\sum_{k=0}^{(M-1)} w_T((n-k)\tau_0)} \quad \text{(Eq. 20)}$$

In step 1010 this estimate is used as the time correction 307.

Figure 11:
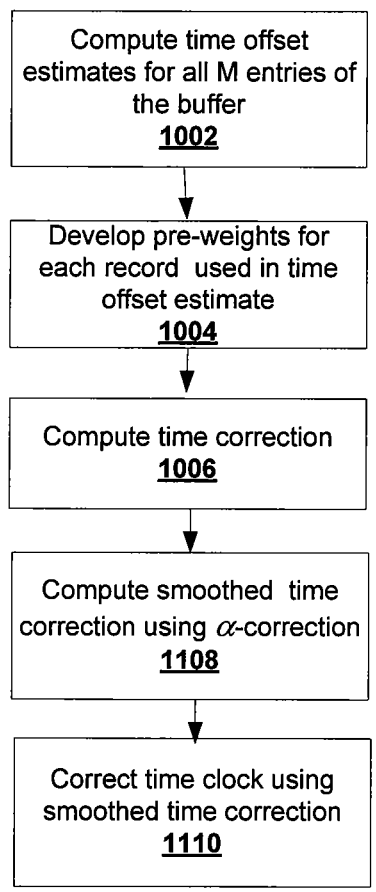
FIG. 11 is a flow diagram of method steps for generating a time/phase correction according to another embodiment of the present invention.

In another embodiment of the invention, the time correction is smoothed using an α-shaping factor. The method steps of this extension are shown in FIG. 11. The steps 1002, 1004, 1006 are substantially the same as in FIG. 10. The extension first develops an α-shaping factor as in the frequency correction case. The appropriate value of α is obtained as in step 904. The α-shaping factor can be applied to the time-offset estimator in the same manner it is applied to the frequency-offset estimator. That is, in step 1108 the smoothed version of time correction is computed as $$\xi_{act}(n\tau_0) = \alpha \cdot \xi_{avg}(n\tau_0) + (1-\alpha) \cdot \xi_{act}((n-1)\tau_0) \quad \text{(Eq.21)}$$

and in step 1110 this is used as the time correction 307 and applied to the NCO subsystem 305.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method of correcting a clock, comprising:
   receiving packets during at least first and second time windows;

computing transit delays associated with the packets based on time stamps contained in the packets received during the first and second time windows;
determining a representative transit delay for each of the first and second time windows;
receiving packets during a plurality of additional time windows;
computing transit delays associated with the packets based on time stamps contained in the packets received during the additional time windows;
determining a representative transit delay for each of the additional time windows;
estimating an offset of the clock based on the representative transit delays of at least two time windows, wherein the estimated offset is a weighted average of offset estimates each made based on one or more of the representative transit delays for associated time windows; and
correcting the clock using the estimated offset.

2. The method of claim 1, wherein:
the additional time windows include third and fourth time windows and fifth and sixth time windows, and
the first and second time windows are separated by a first time interval, the third and fourth time windows by a second time interval that is larger than the first time interval, and the fifth and sixth time windows by a third time interval that is larger than the first time interval.

3. The method of claim 2, wherein said estimating the offset includes:
estimating a first offset based on the representative transit delays of the first and second time windows;
estimating a second offset based on the representative transit delays of the third and fourth time windows; and
estimating a third offset based on the representative transit delays of the fifth and sixth time windows.

4. The method of claim 3, wherein the offset is estimated as the weighted average of the first, second, and third offsets.

5. The method of claim 1, wherein the first and second time windows are of substantially the same size.

6. The method of claim 1, wherein the clock is corrected using the currently estimated offset and one or more previously estimated offsets.

7. The method of claim 1, wherein the representative transit delay for the first time window is a minimum transit delay computed for the first time window and the representative transit delay for the second time window is a minimum transit delay computed for the second time window.

8. The method of claim 1, wherein the offset is a frequency offset.

9. A method of correcting a clock, comprising:
receiving and transmitting packets during a time window;
computing transit delays associated with the packets based on time stamps contained in the received and transmitted packets;
determining a first representative transit delay of the received packets and a second representative transit delay of the transmitted packets;
receiving and transmitting packets during a plurality of additional time windows;
computing transit delays associated with the packets received and transmitted during the additional time windows based on time stamps contained therein; and
for each additional time window, determining a representative transit delay of the packets received during the additional time window and a representative transit delay of the packets transmitted during the additional time window;
estimating an offset of the clock based on the first and second representative transit delays and the representative transit delays of the packets received and transmitted during the additional time windows, wherein the estimated offset is a weighted average of offset estimates each made based on representative transit delays for packets received and transmitted during an associated time window; and
correcting the clock using the estimated offset.

10. The method of claim 9, wherein the offset estimates each made based on representative transit delays for packets received and transmitted during the associated time window include a first offset which is based on the first and second representative transit delays and additional offsets which are respectively based on the representative transit delays of the packets received and transmitted during the additional time windows.

11. The method of claim 9, wherein the clock is corrected using the currently estimated offset and one or more previously estimated offsets.

12. The method of claim 9, wherein the first representative transit delay is a minimum transit delay computed for the received packets and the second representative transit delay is a minimum transit delay computed for the transmitted packets.

13. The method of claim 9, wherein the offset is a time/phase offset.

14. A method of correcting a clock, comprising:
storing representative transit delays associated with a plurality of previous time windows in a buffer;
computing transit delays associated with packets based on time stamps contained in the packets received and transmitted during a current time window;
determining a representative transit delay for each of the received packets and the transmitted packets;
storing the representative transit delays for the received packets and the transmitted packets in the buffer;
estimating an offset of the clock based on the representative transit delays stored in the buffer, wherein the estimated offset is a weighted average of offset estimates each made based on one or more of the representative transit delays for associated time windows; and
correcting the clock using the estimated offset.

15. The method of claim 14, wherein the offset is a frequency offset that is estimated based on representative transit delays associated with at least two time windows.

16. The method of claim 14, wherein the offset is a time offset that is estimated based on representative transit delays for the packets received and transmitted during at least one time window.

17. A clock correction device, comprising:
a buffer that stores representative transit delays associated with a plurality of time windows; and
a processing unit programmed to estimate an offset of the clock based on at least two representative transit delays stored in the buffer, wherein the estimated offset is a weighted average of offset estimates each made based on one or more of the representative transit delays for associated time windows.

18. The device of claim 17, wherein the processing unit is programmed to estimate the offset by:
estimating a first offset based on the representative transit delays of first and second time windows stored in the buffer;
estimating a second offset based on the representative transit delays of third and fourth time windows stored in the buffer; and estimating a third offset based on the representative transit delays of fifth and sixth time windows stored in the buffer.

19. The device of claim 18, wherein the processing unit is programmed to estimate the offset as the weighted average of the first, second, and third offsets.

20. The device of claim 17, wherein the processing unit is further programmed to compute transit delays associated with a group of packets based on time stamps contained in the packets, determine a representative transit delay based on the computed transit delays, and store the representative transit delay in the buffer.

21. The device of claim 17, wherein the buffer is a circular buffer.

22. The device of claim 17, wherein the offset is a frequency offset that is estimated based on representative transit delays associated with at least two time windows.

23. The device of claim 17, wherein the offset is a time offset that is estimated based on representative transit delays associated with at least one time window.

* * * * *